Patented Oct. 15, 1940

2,218,448

UNITED STATES PATENT OFFICE 2,218,448

PRETREATMENT OF CELLULOSE

Coleman R. Caryl, Riverside, Conn., assignor to American Cyanamid Company, New York, N. Y., a corporation of Maine No Drawing. Application June 27, 1939,
Serial No. 281,325

3 Claims. (Cl. 260—229)

This invention relates to the esterification of cellulose, as in the preparation of cellulose nitrate, cellulose acetate, cellulose propionate, cellulose butyrate and the like. More particularly, the invention relates to the pretreatment of cellulose such as cotton linters in order to loosen the fibres thereof in advance of its esterification.

The esterification of cellulose is remarkably facilitated when the fibres thereof have been treated with a concentrated solution of alpha hydroxy isobutyric acid. This pretreatment is preferably carried out at elevated temperatures of 80–120° C. for periods of 1 to 3 hours, depending on the type of cellulose and the type of subsequent esterification to which it is to be subjected.

For most purposes, as in the preparation of cellulose nitrate and cellulose acetate, a pretreatment with an 80% aqueous solution of alpha hydroxy isobutyric acid at 80–100° C. for 2 hours is satisfactory.

Upon completion of the pretreatment with the alpha hydroxy isobutyric acid solution the excess acid is preferably separated from the fibre by centrifuging and washing after which the fibre is dried. It is then subjected to the usual esterification process, for example with acetic acid and acetic anhydride in the usual manner.

In some cases, as in the preparation of cellulose esters of higher aliphatic acids such as butyric or propionic acids, chlorinated alpha hydroxy isobutyric acids may be used to advantage. These acids are obtained by reacting the corresponding chloracetones, such as mono- or dichloracetone, with hydrocyanic acid followed by hydrolysis to the carboxylic acid. Similarly, higher homologs of alpha hydroxy isobutyric acid may be used in similar manner, such as ethyl lactic acid, isopropyl lactic acid and the like.

The invention will be illustrated in greater detail by the following specific example. It should be understood, however, that this example is given primarily for purposes of illustration and that the invention in its broader aspects is not limited thereto.

*Example*

1 part of cotton linters is stirred into an aqueous solution of alpha hydroxy isobutyric acid of 80% strength which has been heated to 85° C. The stirring is continued for 2 hours while the temperature of the solution is maintained at 80–90° C. The solution is then drained away from the fibre which is washed with water, dried, and esterified in the usual manner. Cellulose pretreated in this manner can be esterified with smaller quantities of acetic acid and acetic anhydride and in less time than is required for the esterification of untreated cellulose.

What I claim is:

1. A method of pretreating cellulose in advance of the esterification thereof which comprises heating it with a concentrated aqueous solution of alpha hydroxy isobutyric acid for about 2 hours.

2. A method of pretreating cellulose in advance of the esterification thereof which comprises heating it with a concentrated aqueous solution of alpha hydroxy isobutyric acid for about 2 hours at temperatures of 80–90° C.

3. A method of preparing cellulose esters which comprises pretreating cellulose with a hot concentrated aqueous solution of alpha hydroxy isobutyric acid, removing the pretreating solution, and subjecting the resulting pretreated cellulose to the action of an esterification agent.

COLEMAN R. CARYL.